(12) United States Patent
Akhavi et al.

(10) Patent No.: US 9,789,419 B2
(45) Date of Patent: Oct. 17, 2017

(54) RESTORING COOLING TOWER OUTLET FOG INTO WATER CYCLE

(71) Applicants: Hossein Akhavi, Tehran (IR); Amir Ali Akhavi, Tehran (IR); Khosro Akhavi, Tehran (IR); Mohammad Sabouri Mizab, Karaj (IR)

(72) Inventors: Hossein Akhavi, Tehran (IR); Amir Ali Akhavi, Tehran (IR); Khosro Akhavi, Tehran (IR); Mohammad Sabouri Mizab, Karaj (IR)

(*) Notice: Subject to any disclaimer, the term of this patent is extended or adjusted under 35 U.S.C. 154(b) by 164 days.

(21) Appl. No.: 14/641,423

(22) Filed: Mar. 8, 2015

(65) Prior Publication Data

US 2016/0258695 A1  Sep. 8, 2016

(51) Int. Cl.
| | |
|---|---|
| *B01F 3/04* | (2006.01) |
| *B01D 1/30* | (2006.01) |
| *B01J 19/32* | (2006.01) |
| *F28C 1/02* | (2006.01) |
| *F28C 1/04* | (2006.01) |
| *F28C 1/16* | (2006.01) |
| *F28F 25/00* | (2006.01) |

(52) U.S. Cl.
CPC .............. *B01D 1/305* (2013.01); *B01J 19/32* (2013.01); *F28C 1/02* (2013.01); *F28C 1/04* (2013.01); *F28C 1/16* (2013.01); *F28F 25/00* (2013.01); *B01J 2219/32213* (2013.01); *B01J 2219/32258* (2013.01); *B01J 2219/32483* (2013.01); *F28F 2025/005* (2013.01)

(58) Field of Classification Search
CPC ...... B01D 1/305; B01F 3/04049; B01J 19/32; B01J 2219/32213; B01J 2219/32258; B01J 2219/32483; F28C 1/02; F28C 1/04; F28C 1/16; F28F 25/00; F28F 25/06; F28F 25/08; F28F 2025/005

USPC .............................. 261/29, 30, 117, DIG. 11
See application file for complete search history.

(56) References Cited

U.S. PATENT DOCUMENTS

| | | | | |
|---|---|---|---|---|
| 1,564,075 | A * | 12/1925 | Lakin ..................... | F28C 1/00 261/111 |
| 3,081,987 | A * | 3/1963 | Meek ...................... | F28C 1/02 261/112.2 |
| 3,802,675 | A * | 4/1974 | Cates ...................... | F28C 1/04 261/111 |
| 3,807,145 | A * | 4/1974 | Engalitcheff, Jr. ....... | F28C 1/12 239/550 |
| 5,403,523 | A * | 4/1995 | Strock .................. | B01D 53/504 261/111 |
| 6,527,257 | B1 * | 3/2003 | Schuld .................. | B05B 17/085 239/17 |

(Continued)

*Primary Examiner* — Charles Bushey
(74) *Attorney, Agent, or Firm* — Azadeh Saidi (57) ABSTRACT

The invented system used in wet cooling tower, restore outlet fog of cooling tower into collection basin and consequently cooling water cycle. This invention consists of three main components; pump and its pertaining piping, waterfall and micron fog eliminator. In the first stage, the air containing fog is passed through a waterfall before exhausting. This action causes some portions of fog to condensate and fall down, remaining droplets of the fog grow and together with air cross the fog eliminator blades. Fog's droplets are entrapped between blades, leave the air, and restore to the tower. Therefore, humidity of exhausted air from tower will be effectively reduced.

12 Claims, 6 Drawing Sheets

(56) References Cited

U.S. PATENT DOCUMENTS

| | | | | |
|---|---|---|---|---|
| 7,815,173 B2* | 10/2010 | Lin | ............. | F28D 3/02 |
| | | | | 165/104.32 |
| 7,887,030 B2* | 2/2011 | Hentschel | ............. | F28C 1/04 |
| | | | | 165/900 |
| 8,827,247 B2* | 9/2014 | Kanel | ............. | F24F 6/02 |
| | | | | 261/29 |
| 2004/0013563 A1* | 1/2004 | Romer | ............. | C02F 1/4674 |
| | | | | 422/28 |
| 2007/0187849 A1* | 8/2007 | Okada | ............. | B01D 53/78 |
| | | | | 261/115 |

* cited by examiner

RESTORING COOLING TOWER OUTLET FOG INTO WATER CYCLE

FIELD OF THE INVENTION

This invention is pertaining to improvement and modification of wet cooling towers. Specifically, subjected system used in wet type cooling towers, to restore cooling tower fog to collection basin and consequently water cycle in cooling tower.

BACKGROUND OF THE INVENTION

Choosing wet cooling towers for rejecting waste heat and transferring to atmosphere are the best choices in many branches of industries including exothermic process. In these towers, hot water is sprayed on tower fills from top to bottom and ambient fresh air meet water on tower fills from bottom to top (in counter flow wet cooling tower) or laterally (in cross flow wet cooling towers), which lead to lower temperature of water.

During rejecting heat from water and transferring to atmosphere in this cycle, some portions of circulating water are vaporized and are discharged with air from tower, so water vapor plumes (fog) will form out of cooling tower. Water evaporation causes deduction in circulating water at 1 to 2 percent (or more) in the cycle, which known as the only problem of wet type cooling towers. (Various factors may influence circulating water amount like dispersion or splash of water, wind blowing and density variation of water (as an internal process in the tower), but up to 90% of water deduction is subjected due to evaporation).

Deduction in water quantity necessitates adding make up water to the system, so proving extra water, leads to increase in costs, deduction in regional water resources, and impact to environment and even in the case of water shortage the whole system will become inefficient. Furthermore, water deduction due to evaporation, increases water sediments, which results in some difficulties in pipes and pumps. In addition, exhaled fog creates visual pollution in environment, increase the risk of freezing tower adjacent roads, and can precipitate of ice and rain around tower during cold seasons.

Therefore, many efforts have been made to solve a problems regarding undesirable water evaporation, deduction or elimination of forming plums of water vapor (fog) produced by cooling towers. Utilizing hybrid (wet-dry) towers was considered as a solution, but high cost of commissioning and maintenance of such kind of towers prevents its wide application, so despite existence of fog in wet cooling towers, they still have the greatest application in cooling processes. Decreasing humidity of incoming fresh air into tower and pre-cooling of inlet warm water before entering to tower, were subjected as two other solutions but complexity, high cost and decreasing efficiency of towers have kept them away from universal applications.

As it is commonly used in many cases, the simplest method for solving problem of water deduction is utilization of drizzle eliminator suited on the route of discharged air that absorbs moisture content of exhausted air partially and restores to tower. Drizzle eliminators which are used in cooling towers nowadays, are usually installed horizontally either against vertical flow in wet cooling tower with counter flow, or against horizontal flow in wet cooling tower with cross flow. They are suitable for absorbing greater water drops (greater than 100 microns in diameter), while formed fog ordinarily has water droplets with diameter in the range of 2 up to 10 microns. Therefore, the current drizzle eliminators are not able to absorb majority of droplets and main percentages of moisture eliminated by them consist of splashed water around the tower.

A foresaid facts show that problems of cooling towers fog and consequently water deduction in water cycle have not solved effectively yet. Therefore, ground water sources, wells, and other water resources will be consumed to supply huge cooling towers of power plants, oil refineries, steel industries, and other industries with exothermic processes, which will increase the costs and will acquire dryness for the region.

SUMMARY OF THE INVENTION

The invented system solves above-mentioned problems by restoring outlet fog to cooling tower simply and cost effectively. The system consists of main components, pump, waterfall and pertaining piping and micron fog eliminator. In this system wet discharged air is passed through a waterfall. (A pump provides water for waterfall from tower collection basin). Some portions of fog particles in discharged air with diameter around 10 microns are condensate during this process and pour down. Remaining droplets of the fog grow in size after passing through the waterfall and entering between fog eliminator blades together with air at a proper velocity. These larger particles are entrapped between fog eliminator blades, leave the air, and therefore adhere to the blades' walls and restore to circulating water of the tower. Temperature of cooled water in tower collection basin remains constant during the function steps of invented system.

When the invented system is installed in cooling tower, about 75% of outlet fog can be restored to tower water cycle annually (more than 55% in summer and more than 95% in winter). In addition to reduction of environmental problems, this amount causes a noticeable saving in water consumption and reduces dryness problems in adjacent areas to tower, so reduces cost of makeup water consequently.

It's noteworthy that restored water is obtained from condensing outlet fog, so it is completely pure and therefore feeding this kind of water instead of makeup water, solves problems of using impure water in the cycle like sediments, water hardness and dissolved gases. Solving these problems reduce minor expenditure for water treatment service and repairs.

Use of this system can be taken into consideration when cross or counter flow wet cooling tower is going to be designed or can be installed on fabricated towers or even operating one (with cross or counter flow) only after minor modification and changes on them.

DESCRIPTION OF DRAWINGS

FIG. 1.A shows a counter flow wet cooling tower schematically which the invented system type 1 is installed.

FIG. 1.B shows a counter flow wet cooling tower schematically which the invented system type 2 is installed.

LIST OF ALL THE PHYSICAL FEATURES OF THE INVENTION 1, 28-29: warm water inlet
2: nozzles
3, 30-31: warm water
4, 34-35: cooling tower fills
5, 36-37: fresh air
6, 38: cooled water
7, 32-33, 39: collection basin
8, 40-41: cooled water outlet
10, 44: first discharged air-containing fog (first fog)
11, 45: second discharged air-containing fog (second fog)
12, 54-55: pump
13, 50-51: waterfall header
14, 48-49: micron fog eliminator
15: wall
16: $1^{st}$ basin
17: $2^{nd}$ basin
18, 65-66, 72-73: hose
19, 56-57: pressurized water outlet
20, 46-47: waterfall
21, 62: wet air
22: blades
23, 64: dry air
25: dry air exit port
58: upper wall
59: middle wall
60: bottom wall
63, 71: basin
68: upper wall
69: middle wall
70: lower wall
74: suction fan

DETAILED DESCRIPTION OF THE INVENTION

Figure 1A:
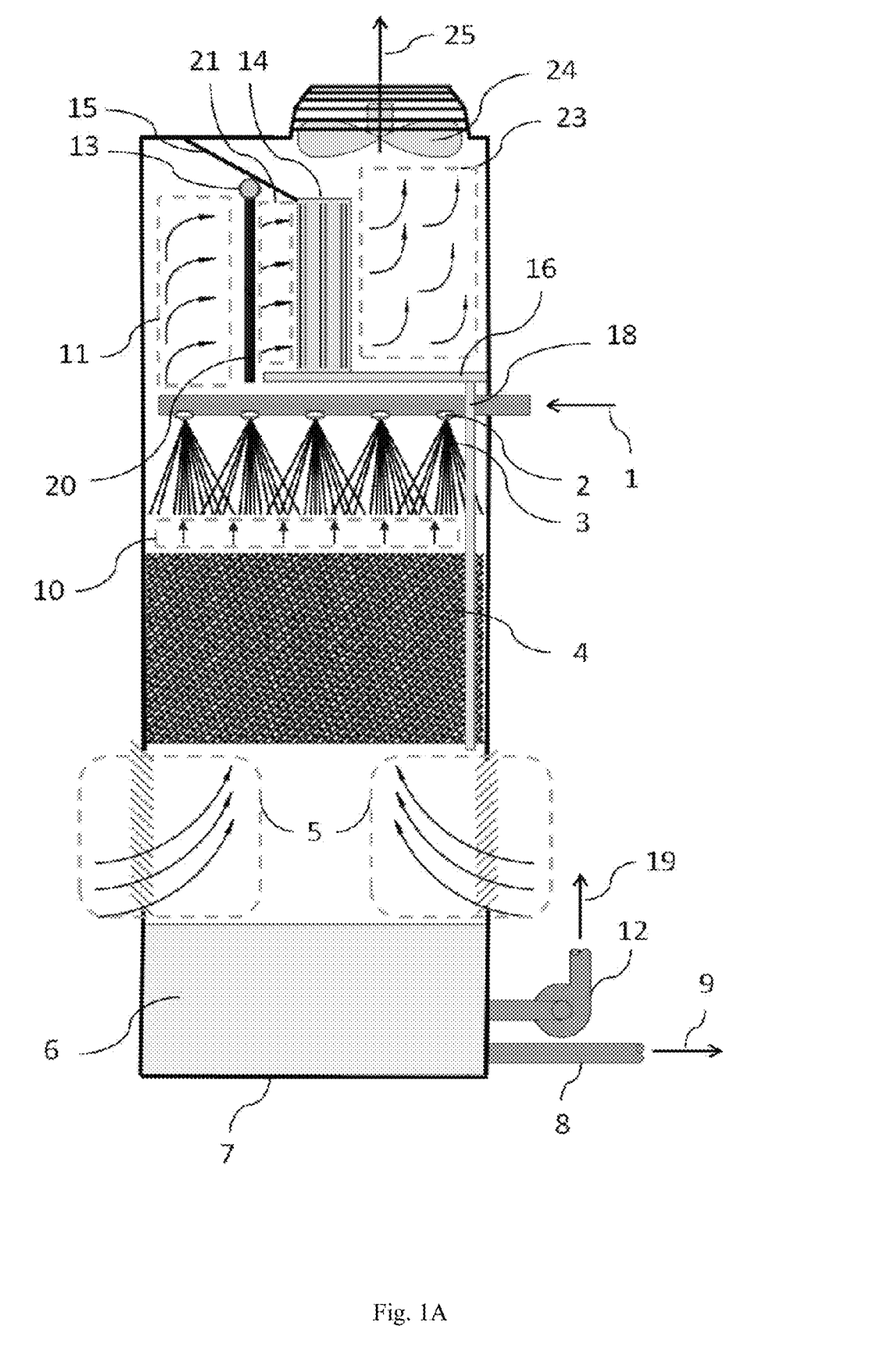

FIG. 1.A shows a common counter flow wet cooling tower, which the invented system is installed on it. According to the FIG. 1A, warm water enters the tower from section (1) and is sprayed by nozzles (2) similar to common counter flow wet cooling towers. Sprayed water (3) is poured down on cooling tower fills (4) and fresh air (5) contacts sprayed water (3) directly on cooling packing. Some portion of warm water is evaporated during this process and the remaining water which has lost its heat, is accumulated in a collection basin (7) at the bottom of the tower as cooled water (6) with proper temperature and will be transferred outside of tower for further usage by piping/outlet (8) from section (9).

In addition, evaporated water with fresh air/airflow (5) moves up and between the fills and the nozzles forming a first discharged air-containing fog (10). This fog (first fog) is saturated (its relative humidity is 100%.). Then the first fog moves upward in the tower and contacts directly with sprayed water (3). In this case, the first fog (10) will reach to higher temperature and humidity and is transformed into a second discharged air-containing fog (a second fog) (11).

By utilizing the invented system, we decided to restore water particles of the second fog/discharged air-containing fog section (11) inside the tower. The invented system comprising of a pump (12) and its pertaining piping, waterfall header (13), micron fog eliminator (14), wall (15), basin (first basin 16 in FIG. 1A and second basin 17 in FIG. 1B) and hose (18). According to FIG. 1A, cooled water (6) enters the pump (12) and will be pressurized by the pump and exit from outlet water (19). This pressurized water is then transferred towards waterfall header (13). Wherein the waterfall header (13) is located above the nozzles on top corner of the tower and after by releasing this water from the upper end of the waterfall header (13) a waterfall (20) effect is created.

It can be seen in FIG. 1A that the second fog due to its higher temperature and humidity level travels above the nozzles (2) and therefore passes through waterfall (20) due to the wall block (15). When the second fog (second discharged air-containing fog) (11) passes through waterfall (20); with respect to coldness of the waterfalls' water (it's at the same temperature as that of the cooled water (6)), some portions of the second fog particles with diameter around 10 microns and higher (preferably less than 100) will be condensate and therefore these waters along the waters from the waterfall are poured down together on packing fills (4). The remaining of the second discharged air-containing fog (11) after passing through waterfall (20), and during a certain process with relative humidity equal to 100% (saturation), loses its humidity content and temperature (its temperature reaches around the temperature of cooled water (6)) and therefore is transformed into humid/wet air (21).

During this process, fog particles content of the second discharged air-containing fog (11) which has reached to a lower temperature, join each other and make greater particles in wet air (21). These particles alongside the wet/humid air (21) particles with a proper speed will enter horizontally into a micron fog eliminator (14).

Figure 2:
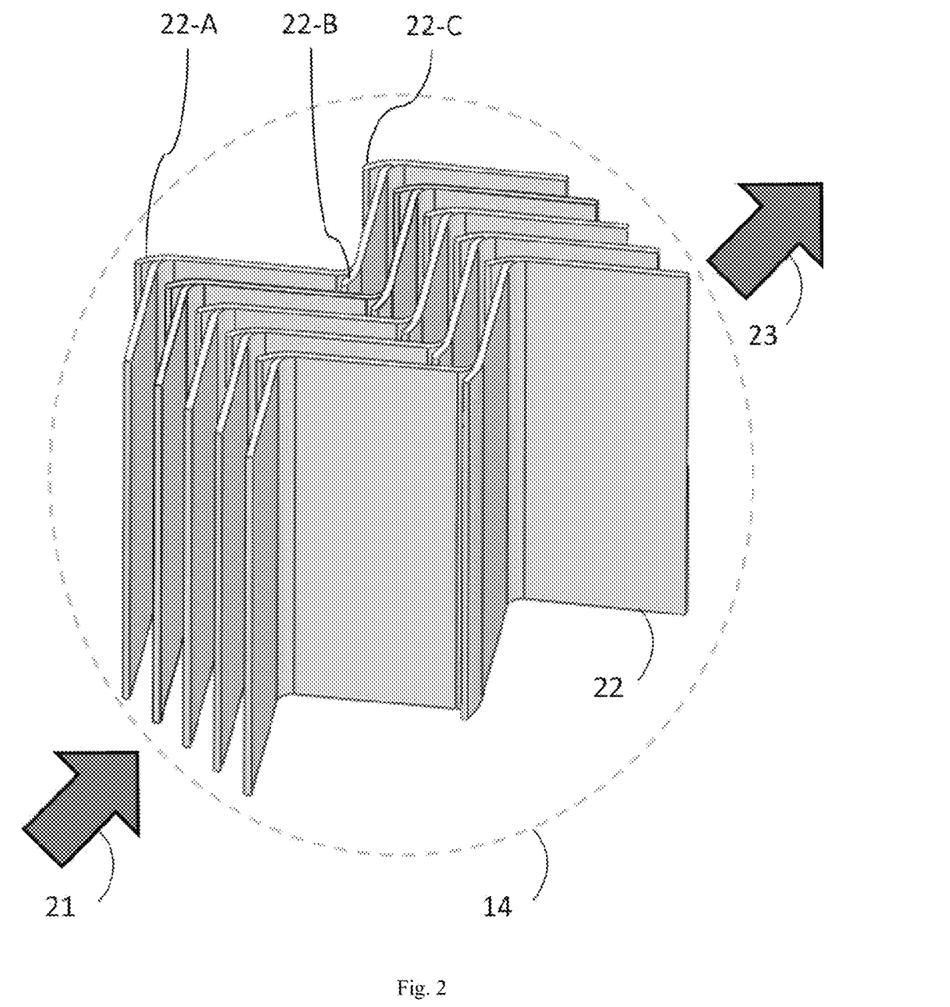
FIG. 2 represents the circumstances of resting micron droplet eliminator in route of wet air.

Micron fog eliminator (14) is made up of several blades (22) with specific thicknesses (i.e 2 to 3 millimeters) which are set in parallel arrangement with specific intervals (21 to 25 mm). As shown in FIG. 2 blades (22) are positioned vertically in the direction of wet air (21) flow. Micron fog eliminator (14) is made up of polyethylene or PVC and considering the specific shape of its blades, is able to absorb water droplets about 10 microns and greater, while normal eliminators have the ability of absorbing greater water particles (greater than 100 microns).

Figure 3:
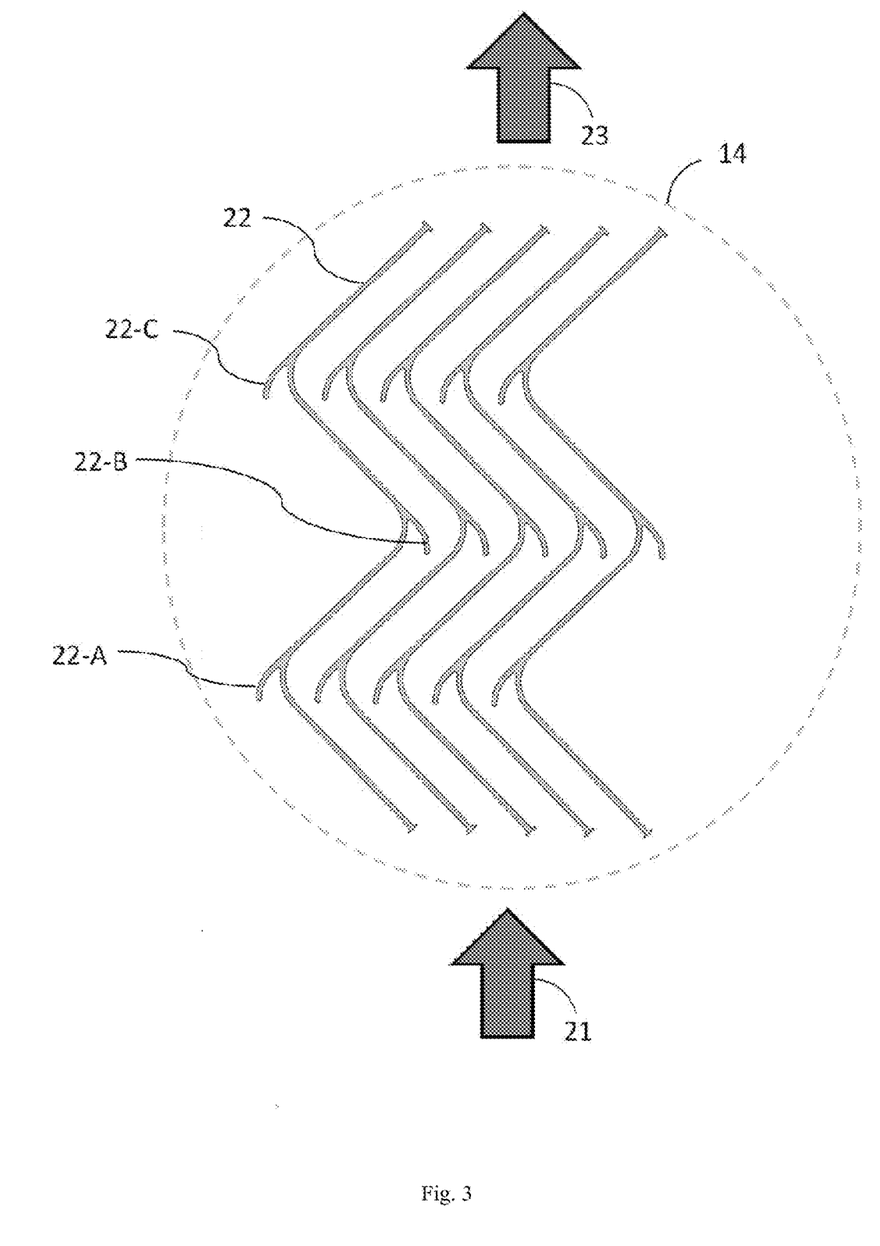
FIG. 3 shows top view of the blades of micron droplet eliminator.

FIG. 3 illustrates top view of blades (22) of micron fog eliminator (14). Intake wet air (21) after arriving into the blades (22) intervals, experiences sudden changes of movement direction due to specific shape of blades. This is while water particles in the wet air (21) that have higher momentum in comparison to other particles in the wet air (20); have a tendency to continue moving straight forward. Therefore in locations along the path of wet air (21) and between blades (22), where a sudden change in direction happens for some particles, the droplets will leave wet air (21) due to their inertia and adhere to blades (22) in places. During this process these particles of wet air (21) which have constant enthalpy reach a lower humidity and a higher temperature level and will finally exit between blades (22) in from of a dry air (23). It is noteworthy that flap sections (22-A), (22-B) and (22-C) are considered in design of blades (22), as seen in FIG. 3. These sections increase the possibility of droplet collision with blades (22) by narrowing the path movement of wet air (21) and increasing the blades' area. Therefore, more droplets adhere to blades (22) and air (21) experiences more pressure drop.

The droplets that had adhered to the blades (22), slide down due to the gravity force and therefore will fall towards the collection basin ($1^{st}$ basin 16 in FIG. 1A and $2^{nd}$ basin 17 in FIG. 1B) located under micron fog eliminator (14) and are accumulated there. As shown in FIG. 1A, hose (18) is connected to the first basin (16), so accumulated water can flow to the main cold-water collection basin (7) via hose (18) and therefore it is restored in the water cycle of the tower.

More over dry air (23) exits from portion (25) of the tower by suction of fan (24). In this case, waterfall (20) also falls down on fills (4) directly.

Figure 1B:
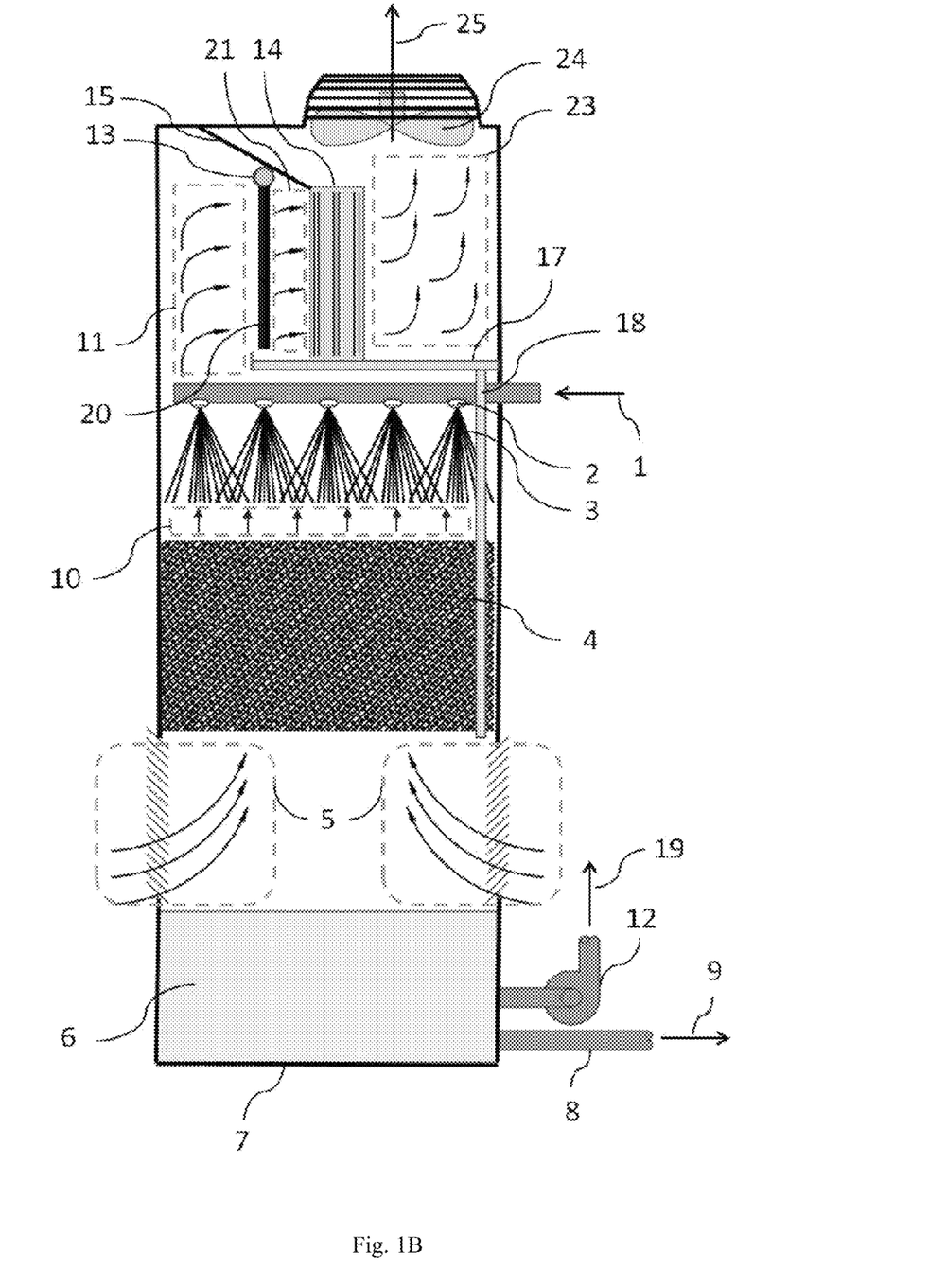

According to FIG. 1B, the invented system type 2 has similar function as type 1, which is described in FIG. 1A, but single difference is to use of basin (17) instead of basin of type 1 ((16) in FIG. 1A). By utilizing basin (17), waterfall (20) pours down in this basin and together with particles obtained from fog eliminator (14) are transmitted to collection basin (7) via hose (18).

Figure 4:
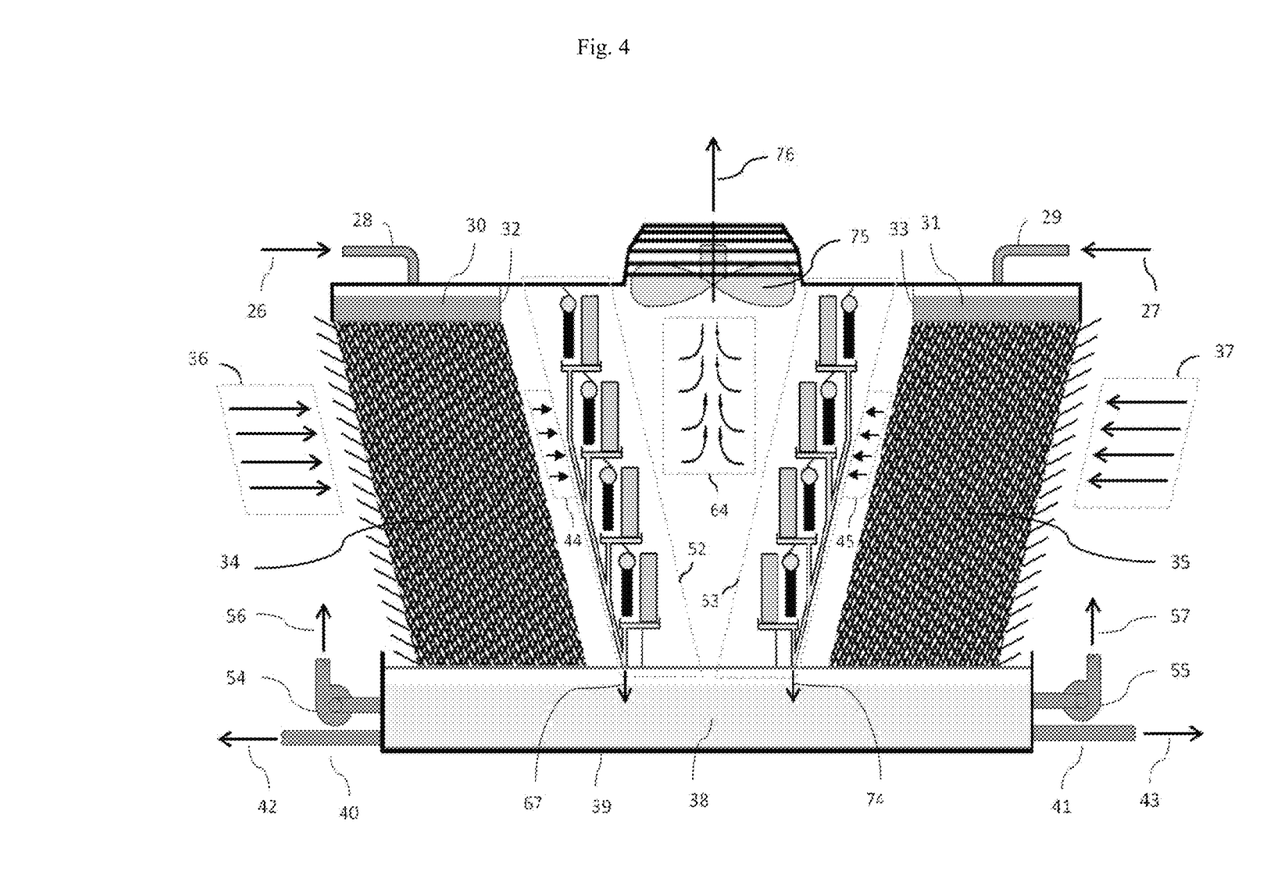
FIG. 4 shows a cross flow wet cooling tower schematically which the invented system is installed.

FIG. 4 shows a cross flow wet cooling tower which the invented system is installed on it. According to FIG. 4, warm waters enter in the tower from sections (26) and (27) via pipes (28) and (29) and warm waters (30) and (31) accumulated in tanks (32) and (33) fall down on cooling tower fills (34) and (35) gradually. Fresh airflows (36) and (37) enter the tower from both lateral sides and contact directly with warm waters (30) and (31) on cooling tower fills (34) and (35). Same as counter flow wet cooling towers, some portion of water is evaporated during this process and remaining water which lost its heat, is accumulated in collection basin (39) at bottom of the tower as cooled water (38) with proper temperature. Cooled water (38) will be transferred outside of tower for further usage by piping (40) and (41) from sections (42) and (43). Also evaporated water with airflows (36) and (37) from discharged airflows-containing fog (44) and (45) (discharged airflows-containing fog (44) and (45) exist all over along the tower and only some parts of them are shown in sections (44) and (45) schematically). Discharged airflows-containing fog (44) and (45) are saturated (their relative humidity is 100%) as same as discharged air-containing fog ((11) FIG. 1A) in counter flow wet cooling towers.

By utilizing the invented system, water particles content of discharged airflows-containing fog (44) and (45) are restored inside the tower. The invented system comprises components same as described for the counter flow wet cooling tower, but the employment of several waterfalls ((46) and (47) in FIG. 5), several micron fog eliminators ((48) and (49) in FIG. 5) and their pertaining elements, instead of one waterfall ((20) in FIG. 1A and FIG. 1B) and a micron fog eliminator ((14) in FIG. 1A and FIG. 1B) and their relevant components are the major differences.

In these towers, fills (34) and (35) are usually installed inclined as can be seen in FIG. 4. Under this circumstance, using several components of invented system, lead to discharged airflows-containing fog (44) and (45) encounter invented system element more effectively. The number of waterfalls ((46) and (47) in FIG. 5), micron fog eliminators ((48) and (49) in FIG. 5) and their pertaining components are designed in accordance with tower height, in such a way that intervals/distance between waterfalls headers ((50) and (51) in FIG. 5) do not exceed one meter. According to FIG. 4, discharged airflows-containing fog (44) and (45) enter sections (52) and (53). These sections are shown in FIG. 5 more clearly.

Figure 5:
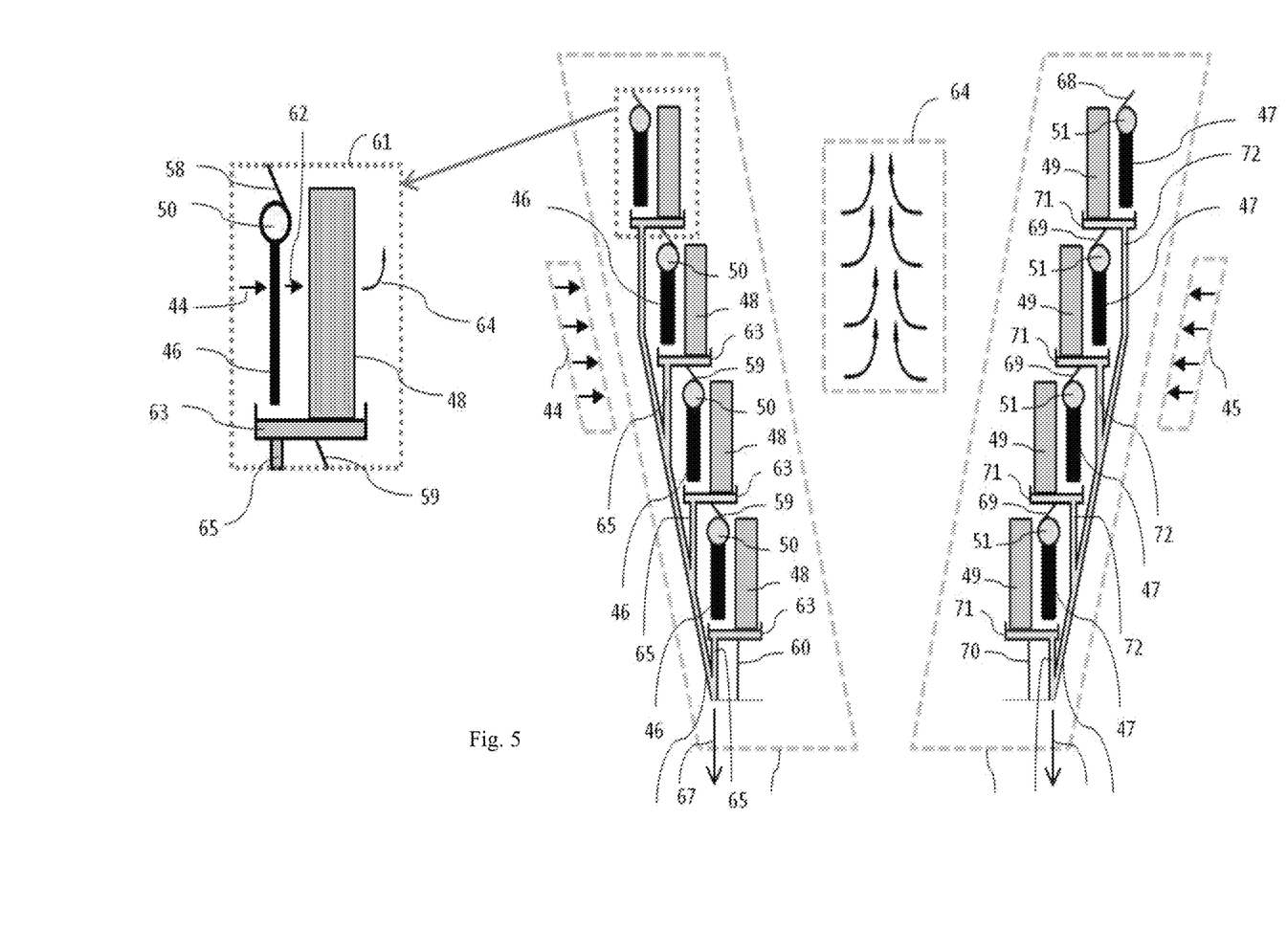
FIG. 5 represents the circumstances of restoring outlet fog of wet cooling tower with cross flow, schematically.

On the basis of FIG. 4, cooled water (38) enters pumps (54) and (55), and outlet waters (56) and (57) which are pressurized by pumps (54) and (55) and then is transferred towards waterfall headers ((50) and (51) in FIG. 5) by aid of necessary piping works. When water is released from headers ((50) and (51) in FIG. 5), waterfalls effect ((46) and (47) in FIG. 5) will be organized.

According to FIG. 5, due to existence of upper wall (58), middle walls (59), and bottom wall (60) of the tower, discharged airflow-containing fog (44) is forced to pass through waterfall (46) in a similar manner as counter flow wet cooling tower. When discharged airflow-containing fog (44) passes through waterfalls (46), with respect to coldness of its water, some portions of fog particles with diameter around 10 microns and higher will be condensate and pour down together with waterfall (46). (One of waterfalls (46) and micron fog eliminator (48) and other adjacent components are shown in section (61) more clearly). Remaining discharged air containing fog (44) also pass through waterfall (46), and during a certain process with relative humidity equal to 100% loose its humidity and temperature (its temperature reaches around the temperature of cooled water (38)) and wet air (62) will be formed. During this process, fog particles content of discharged airflow-containing fog (44), which has reached to a lower temperature, join to each other and make greater particles in wet air (62). These particles with wet air (62) will enter into micron fog eliminator (48) horizontally with a proper velocity.

Micron fog eliminator (48) is completely identical to fog eliminators used in counter flow wet cooling tower ((14) in FIG. 2) and is installed vertically. Fog particles content of wet airflow (62) are trapped inside of micron fog eliminator (48), then leave wet air (62) and fall down in basins (63). During this process, wet air (62) with constant enthalpy reaches to a lower humidity and a higher temperature and finally exits fog eliminator (48) in form of dry air (64).

Under basins (63), hoses (65) are connected. So fallen droplets from micron fog eliminators (48) and poured water of waterfalls (46), which are accumulated into basins (63), are transmitted to main hose (66) via hoses (65) and at last are poured into cold water collection basin ((39) in FIG. 4) from section (67).

On the other side of the tower, in a same manner, by the aid of waterfalls (47), micron fog eliminators (49), upper wall (68), middle walls (69), lower wall (70), basins (71), hoses (72) and main hose (73), outlet fog content of airflow-containing fog (45) will fall into the cold water collection basin ((39) in FIG. 4) via section (74). Therefore, considering FIG. 4, fog content of airflows-containing fog (44) and (45), is restored to collection basin (38) and consequently water cycle of tower via sections (67) and (74) and dry air (64) exits from portion (76) of tower by suction of fan (75). Its noteworthy that basins (63) and (71) can be designed in such a way that waterfalls (46) and (47) pour directly in cold water collection basin ((39) in FIG. 4) without pouring in basins (63) and (71), which is an identical idea in basins of type 1 of invented system counter flow wet cooling tower ((16) in FIG. 1A).

Installing the invented system on wet cooling towers necessitates investigation about ratio of water flow rate to airflow rate and output power of fan for designing as following.

Considering FIG. 1A, after installation of the invented system on a wet cooling tower with counter flow type 1, the flow rate of poured water on cooling tower fills (4) is equal to summation of warm water (1) flow rate and water of waterfall (20). While without this system, the flow rate of poured water is equal to warm water (1) flow rate. Hence, installation of the invented system in this case, increases flow rate of poured water and consequently ratio of water flow rate to air. Increasing this ratio, some design changes will be necessary to achieve desirable cold-water temperature, such as utilizing more fills (4) in tower or increasing fresh air (5) flow rate in such a manner that flow rate of water to air ratio remain constant. If none of these solutions can satisfy the designer, usage of invented system type 2, as shown in FIG. 1B, will be possible. According to FIG. 1B, in this case, water discharged from waterfall (20), with a 
same temperature as cooled water (6) temperature, is poured directly into cold-water collection basin (7) via hose (18). The flow rate of poured water on fills (4) is equal to warm water (1) flow rate. Therefore, in this case it is needless to make remarkable changes on fills (4) design or intake fresh airflow (5) rate. It is noteworthy that, in FIG. 1A (type 1), intake water to collection basin (7) via hose (18) has a lower volume in comparison with cooled water (6) in any moment and in FIG. 1B (type 2), intake water to basin (7) via hose (18) have close temperature as cooled water (6). Thus in both cases, desired temperature of the cooled water ((6) in FIG. 1A and FIG. 1B) is kept unchanged, during all stages of restoring outlet fog to the tower.

Installing the invented system on a cross flow wet cooling towers, will keep the ratio of water to airflow rate constant. Considering FIG. 4, it is needless to increase tower fills (34) and (35) remarkably or multiply intake airflows rate (36) and (37). Furthermore in these towers, considering nearness of temperature of inlet water to collection basin (39) via sections (67) and (74) to cooled water (38), the desired temperature of cooled water (38) in collection basin (39) is kept unchanged, during all stages of restoring process. (In case of direct pouring waterfalls (46) and (47) in collection basin (39), desired temperature of cooled water (38) in collection basin (39) remains constant, considering nearness of temperature of outlet water from waterfalls (46) and (47) to cooled water (38), and low volume of inlet water to collection basin (39) via sections (67) and (74) in comparison with cooled water (38)).

Transforming discharged airflow-containing fog ((11) in FIG. 1A and FIG. 1B and (44), (45) in FIG. 4) to dry air ((23) in FIG. 1A and FIG. 1B and (64) in FIG. 4), as described, causes more pressure drop in comparison with utilization of ordinary drizzle eliminator in wet cooling towers. Therefore when the invented system is installed on a tower, it is vital to apply more powerful electrical motor for the suction fan ((24) in FIG. 1A and FIG. 1B and (75) in FIG. 4) instead of previous designed fan, to send out dry air ((23) in FIG. 1A and FIG. 1B and (64) in FIG. 4) from the tower. Extra costs related to utilizing stronger fan ((24) in FIG. 1A and FIG. 1B and (75) in FIG. 4) and pump ((12) in FIG. 1A and FIG. 1B and (54) and (55) in FIG. 4) in comparison with advantages of saving make up water in a certain period, proves that from economy point of view, utilizing the invented system is perfectly economical and cost effective.

The above identified embodiments describe the invented device in working condition, however it is obvious that other configurations and measurements may be carried out using such device. These embodiments were not intended to limit the functionality and working range of the device, only the description was simply for describing the best mode. It is obvious that the ranges and materials used and the configurations described can be modified for best use in different environments.

We claim:

1. A counter flow wet cooling tower system for cooling warm water comprising; a pump; a waterfall header; a micron fog eliminator; blocking wall, a main collection basin, a first basin; a hose; fill packing; a suction fan; multiple nozzles; wherein said micron fog eliminator comprises multiple blades having specific thickness; wherein said blades absorb water droplets at least 10 microns and higher; wherein said blades are positioned perpendicular with respect to said first basin; said system further comprising a warm water inlet and a cooled pressurized water outlet; wherein said pressurized water outlet transfers cooled water accumulated inside said main basin to said waterfall header; wherein said cooled water falls from said waterfall header forming a waterfall effect against a waterfall wall; wherein said waterfall wall is adjacent to said first basin; wherein said hose connects said first basin and said main basin and transfers said cooled water inside said first basin to said main basin; therefore creating a water cycle inside said tower; wherein warm water enters said tower by said warm water inlet, then said warm water is sprayed directly on said fill packing via said multiple nozzles; wherein said fill packing is in direct contact with cold/ambient air that flows freely through said fills and due to a great temperature difference between said ambient air and said warm water, a portion of said warm water evaporates as a first discharged air-containing fog (first fog) and travels up and above said multiple nozzles to a higher section of said tower where said waterfall and wall block are located at, and wherein a remaining portion of said warm water loses its heat and is accumulated inside said main basin as said cooled water, wherein said first fog travels up towards said warm water and said multiple nozzles and by directly being in contact with said warm water its temperature and humidity increases forming a second discharged air-containing air fog (second fog) which has a higher temperature and higher humidity content in comparison to said first fog and said warm water; and therefore said second fog travels above said multiple nozzles and reaches said waterfall and wall block.

2. The counter flow wet cooling tower system for cooling warm water of claim 1, further comprising wherein said second fog reaches said waterfall and has to travel through said waterfall effect and said cooled water released from said waterfall header due to said wall block.

3. The counter flow wet cooling tower system for cooling warm water of claim 2, wherein said second fog is in direct contact with said pressurized cooled water released from said waterfall header, therefore a first portion of said second fog containing particles with diameter of at least 10 micron and less than 100 microns, condensate into new cooled water; wherein said new cooled water alongside said pressurized cooled water released from said waterfall header accumulate inside said first basin and are transferred via said hose to said main basin.

4. The counter flow wet cooling tower system for cooling warm water of claim 3, wherein a remaining of said second fog particles only lose their temperature and humidity; wherein said temperature of said second fog reaches a temperature of said cooled water in said main basin; therefore said remaining of said second fog transfers into humid/wet air; wherein some particles of said second fog with lower temperature join each other and create larger particles inside said wet air; and therefore alongside said particles of said wet air horizontally enter said micron fog eliminator.

5. The counter flow wet cooling tower system for cooling warm water of claim 4, wherein said micron fog eliminator comprises several blades with specific thickness, arranged in parallel with predetermined intervals; wherein said blades are located vertically and parallel to a flow path of said wet air.

6. The counter flow wet cooling tower system for cooling warm water of claim 5, wherein said micron fog eliminator comprises polyethylene or PVC.

7. The counter flow wet cooling tower system for cooling warm water of claim 6, wherein each of said blades comprising an "M" shaped configuration where at least three flap sections are located at each sharp angle of said "M" shaped blades; wherein all of said flap sections protrude outwards from said M shaped blades and bent slightly towards a center of said M shaped configuration and also face said waterfall header and are in a path of said wet air and wherein a first and third flap sections are located at two top sharp angles of said M shaped blades while a second flap section is located in a middle of said M shaped blades at a bottom sharp angle; wherein while said wet air enters said blades, dry and low pressured air exits said blades.

8. The counter flow wet cooling tower system for cooling warm water of claim 7, wherein said M shaped configuration creates a sudden change in said flow path of some of said particles, and therefore said droplets will leave said wet air due to their inertia and adhere to said blades at different places; said droplets which have constant enthalpy reach a lower humidity and a higher temperature level and will finally exit between said blades in a form of said dry air.

9. The counter flow wet cooling tower system for cooling warm water of claim 8, wherein said flap sections increase an area of said blades and also increases possibility of water droplets collision with said blades by narrowing said path movement of said wet air; therefore more of said droplets adhere to said blades, and as a result pressure of said second fog drops even more.

10. The counter flow wet cooling tower system for cooling warm water of claim 9; wherein said M shaped blades absorb said water droplets of at least 10 microns and preferably less than 100 micron; wherein said droplets due to gravity force fall down towards to and being accumulated in said first basin and then transferred to said main basin via said hose, creating said water cycle.

11. The counter flow wet cooling tower system for cooling warm water of claim 10, wherein said remaining dry air comprising low pressure exits from multiple openings of said tower via said suction fan.

12. The counter flow wet cooling tower system for cooling warm water of claim 11, wherein said waterfall wall and said waterfall header are located inside and on top of said first basin.

* * * * *